United States Patent
O'Krafka et al.

(10) Patent No.: US 7,895,400 B2
(45) Date of Patent: Feb. 22, 2011

(54) HYBRID CACHE COHERENCE USING FINE-GRAINED HARDWARE MESSAGE PASSING

(75) Inventors: Brian W. O'Krafka, Austin, TX (US); Pranay Koka, Austin, TX (US); Robert J. Kroeger, Waterloo (CA)

(73) Assignee: Oracle America, Inc., Redwood City, CA (US)

( * ) Notice: Subject to any disclaimer, the term of this patent is extended or adjusted under 35 U.S.C. 154(b) by 454 days.

(21) Appl. No.: 11/864,507

(22) Filed: Sep. 28, 2007

(65) Prior Publication Data

US 2009/0089511 A1 Apr. 2, 2009

(51) Int. Cl.
G06F 12/08 (2006.01)
(52) U.S. Cl. ............... 711/141; 711/143; 711/E12.039
(58) Field of Classification Search ................ 711/141, 711/143, E12.039
See application file for complete search history.

(56) References Cited

U.S. PATENT DOCUMENTS

| | | | | |
|---|---|---|---|---|
| 6,505,277 | B1 * | 1/2003 | Arimilli et al. | 711/158 |
| 6,865,695 | B2 * | 3/2005 | Joyner et al. | 714/43 |
| 2005/0097147 | A1 * | 5/2005 | Hunt et al. | 707/200 |

OTHER PUBLICATIONS

Kavi, Krishna, Kim, Hyong-Shik, Lee, Ben, Hurson, Ali, Shared Memory and Distributed Shared Memory Systems: A Survey, University of Alabama, Oregon State University, Penn State University, No Date, pp. 19.

Hennessy, John, Heinrich, Mark, Gupta, Anoop, Cache-Coherent Distributed Shared Memory: Perspectives on Its Development and Future Challenges, IEEE, Proceedings of the IEEE, vol. 87, No. 3, Mar. 1999, pp. 418-429.

Roy, Sumit, Chaudhary, Vipin, Strings: A High-Performance Distributed Shared Memory for Symmetrical Multiprocessor Clusters, TR-98-02-47, Parallel and Distributed Computing Laboratory, Wyane State University, No Date. pp. i, 1-11.

Heinlein, John, Gharachorloo, Kourosh, Dresser, Scott, Gupta, Anoop, Integration of Message Passing and Shared Memory in the Stanford FLASH Multiprocessor, Computer Systems Laboratory, Stanford University, http://www-flash.stanford.edu/architecture/papers/flash_msg/, printed Feb. 21, 2007, pp. 28.

Scales, Daniel J., Gharachorloo, Kourosh, Thekkath, Chandramohan A., Shasta: A Low Overhead, Software-Only Approach for Supporting Fine-Grain Shared Memory, Western Research Laboratory; Systems Research Center, Digital Equipment Corp., ASPLOS VII, Oct. 1996, pp. 174-185.

(Continued)

*Primary Examiner*—Mardochee Chery
(74) *Attorney, Agent, or Firm*—Marsh Fischmann & Breyfogle LLP (57) ABSTRACT

Multiprocessor systems conducting operations utilizing global shared memory must ensure that the memory is coherent. A hybrid system that combines hardware memory transactions with that of direct messaging provides memory coherence with minimal overhead requirement or bandwidth demands. Memory access transactions are intercepted and converted to direct messages which are then communicated to a target and/or remote node. Thereafter the message invokes a software handler which implements the cache coherence protocol. The handler uses additional messages to invalidate or fetch data in other caches, as well as to return data to the requesting processor. These additional messages are converted to appropriate hardware transactions by the destination system interface hardware.

20 Claims, 5 Drawing Sheets

OTHER PUBLICATIONS

Kontothanassis, Leonidas I., Scott, Michael L., Software Cache Coherence for Large Scale Multiprocessors, Department of Computer Science, University of Rochester, First IEEE Symposium on High-Performance Computer Architecture, Jan. 22-25, 1995, pp. i-ii, 286-295.

Li, Kai, Ivy: A Shared Virtual Memory System for Parallel Computing, Department of Computer Science, Princeton University, No Date, pp. 94-101.

Radovic, Zoran, Software Techniques for Distributed Shared Memory, Uppsala Universitet, Nov. 18, 2005, pp. i-iv, vii-xi, 1-121.

* cited by examiner

HYBRID CACHE COHERENCE USING FINE-GRAINED HARDWARE MESSAGE PASSING

RELATED APPLICATIONS

This application is related to the subject matter disclosed in U.S. patent application Ser. No. 11/864,414 filed on Sep. 28, 2007 for "Direct Messaging in Distributed Memory Systems", co-assigned to Sun Microsystems, Inc., assignee of the present invention, the disclosure of which is herein specifically incorporated by this reference.

BACKGROUND OF THE INVENTION

1. Field of the Invention

Embodiments of the present invention relate, in general, to message passing and particularly to message passing in distributed shared memory architectures implementing hybrid cache coherence protocols.

2. Relevant Background

Parallel computing is the simultaneous execution of some combination of multiple instances of programmed instructions and data on multiple processors in order to obtain results faster. One approach to parallel (multithread) processing utilizes multiple processors accessing a shared memory system. The complexity, however, to provide a fully cache-coherent shared memory space is typically high, thus spawning several different approaches to address this need. One such approach relies on distributed memory in which nodes can only access their local memory; data can only be transferred between nodes via explicit messages. Messaging passing systems are routinely scaled to thousands of nodes since all data transfer is explicitly managed by application software. In spite of their scalability, message passing systems are usually much more difficult to program than shared memory systems, requiring many more lines of code.

Distributed shared memory is essentially an architectural approach designed to overcome the scaling limitations of symmetric shared memory multi-processors while retaining a shared memory model for communication and programming. This is achieved by using a memory that is physically distributed, but logically implements a single shared address space, allowing the processor to communicate through, and share the contents of, the entire memory. In addition to the sharing of data, distributed shared memory is also concerned with an interconnection network that can provide data to a requesting processor in an efficient and timely fashion. Bandwidth (the amount of data that can be supplied in a unit of time) and latency (the time it takes a node to receive the first piece of requested data from the time the request is issued) are both important. Distributed shared memory involves moving data dynamically across the memory layers of a distributed system. One approach to such movement is for the data to be uniquely mapped to a physical address in a cache coherent system. Data can be replicated and directories track the multiple copies. The coherency of this data is maintained, typically by either hardware or software. Hardware cache coherence solutions often manage data at a much finer granularity (e.g. typically 64B blocks) than software solutions.

One approach to cache coherency, as is known to one skilled in the art, utilizes snoopy or snooping protocols. Snooping is the process where the individual caches monitor address lines for accesses to memory locations that they have cached. When a write operation is observed to a location that a cache has a copy of, the cache controller invalidates its own copy of the snooped memory location. The basic idea is to enforce the property that before a memory location is written, all other copies of the location which may be present in other caches, are invalidated. Thus, the system allows multiple copies of a memory location to exist when it is being read, but only one copy when it is being written. When a processor wants to write into a cache block that may be shared, a snoopy protocol transmits the request to all other processors over the interconnection network, and all caches that have a copy of the cache block simply invalidate the copy. Unfortunately, the broadcasting of all miss requests required by snoopy schemes does not scale to large systems.

Directory based protocols are another approach to cache coherency as known in the art. Directory based schemes rely on an extra structure called the directory that tracks which processors have cached any given block in main memory. To maintain coherence the state of each cache block is tracked in the cache and additional information is kept in the directory for each block. The directory is nothing more than a piece of memory or a table on a node that holds information about the memory of that node. A simple protocol operates with the three states of invalid, shared or exclusive. Unlike the snoopy system, the directory based protocol system obtains the information about which processors are sharing a copy of the data from a known location rather than interrogating all the processors by a broadcast.

Distributed directory protocols are therefore a cache-coherency architecture that builds on the directory concept but distributes the directory just as a block of memory is distributed. Although simple in concept, this approach introduces many complexities due to the use of messages. Since few of the protocol actions can be atomic, the protocol is implemented by sending messages among, 1) a requesting processor node (the requester "R") also known as the local node; 2) the node containing the address of the data block that the local node desires to read or write (also known as the home node "H"); and 3) a remote node that contains the cache block when it is in the exclusive state (sometimes referred to as the target node "T"). Thus at least two messages are required. A first message from the local to the home node to request a cache block and a second message from the home node to the local node to reply with the data.

Coherent shared memory support in message passing systems is generally realized by emulating it in software and/or by compiler directed coherence. These techniques have limitations in applicability and performance. Compiler based coherence is problematic for system software and commercial applications, such as databases. Nonetheless, a number of software shared memory schemes have been proposed. These schemes provide a software implementation of coherence protocols but vary in the extent of application/binary modification, kernel/user-level implementation, granularity of coherence and other system specific performance optimizations.

A number of software distributed shared memory schemes have been proposed, as will be recognized by those skilled in the relevant art. These schemes are generally inefficient because they maintain coherence at the granularity of pages and/or require extra instructions to perform shared load or store operations. Maintaining coherence at page granularity is inefficient because it increases false sharing, which increases cache misses and coherence traffic.

SUMMARY OF THE INVENTION

Briefly stated, embodiments of the present invention involve systems and methods to process memory access to global shared memory using fine-grained messages in distributed shared memory architectures implementing hybrid cache coherence protocols. Hybrid coherence protocols are those which are implemented in some combination of hardware and software. The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resorting to the claims being necessary to determine such inventive subject matter.

Embodiments of the present invention provide light weight, cost effective mechanisms for implementing cache-coherency on message passing systems. According to one embodiment of the present invention a hybrid hardware/software scheme provides coherency at the granularity of cache blocks with moderate overhead. Mechanisms of the present invention use direct message support on systems for coherence activity. Hence the amount of coherence overhead is comparable to that of hardware coherence.

Unlike pure software distributed shared memory techniques that require large coherence granularity (page based) which causes large bandwidth demands and leads to a high degree of false sharing, embodiments of the present invention maintain coherence per cache line, reducing false sharing and minimizing bandwidth needs. Furthermore, the present invention makes optimal use of direct messaging hardware to keep the overheads negligible as compared to software schemes that incur large overheads in coherence processing. Direct messages are defined as efficient, hardware supported messages that can be sent and received in user mode with very few assembler instructions. Efficient messaging includes sending messages as small as a cache line with high sustained bandwidth on the system interconnect. Finally, other distributed shared memory schemes require modifications to applications or binaries which limits portability. The present invention's coherence mechanism is transparent to the application. Hence it has profound use in complex applications like Operating System kernels, commercial workloads and High Performance Cluster applications.

According to one aspect of the present invention a cache coherency system in a message passing multiprocessor architecture is provided that includes a plurality of nodes interconnected by a switch wherein each node includes at least one processor, a cache, a main memory and a system interface. A portion of the main memory of each of the plurality of nodes forms a distributed shared memory. Furthermore the system includes a messaging module configured to convert memory transactions regarding the distributed shared memory into messages, and to convert messages regarding the distributed shared memory into memory transactions.

Another aspect of the present invention describes a method for managing cache coherency in a message passing multi-processor architecture that includes a plurality of nodes interconnected by a switch. Again each node in the architecture includes at least one processor, a cache, a main memory and a system interface. The method begins by issuing a cache miss request by one of the at least one processors at a first node of the plurality of nodes to a second node. The cache miss request is intercepted by the system interface at the first node and converted to a message. The message is communicated to the second node. After receiving the message the second node determines the state of a cache block, processes the message and updates the state of the cache block.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Systems and methods for accessing a cache coherent distributed memory using direct messaging are hereafter disclosed. According to one embodiment of the present invention, a system interface resident on each node of a distributed memory system converts remote load/store memory access requests into direct messages. Similarly, some direct messages received by a node are converted into local hardware transactions directing load/store memory access. A coherence protocol is implemented in software by the direct message handlers while other operations remain hardware based.

Specific embodiments of the present invention are hereafter described in detail with reference to the accompanying figures. Like elements in the various figures are identified by like reference numerals for consistency. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention.

Figure 1:
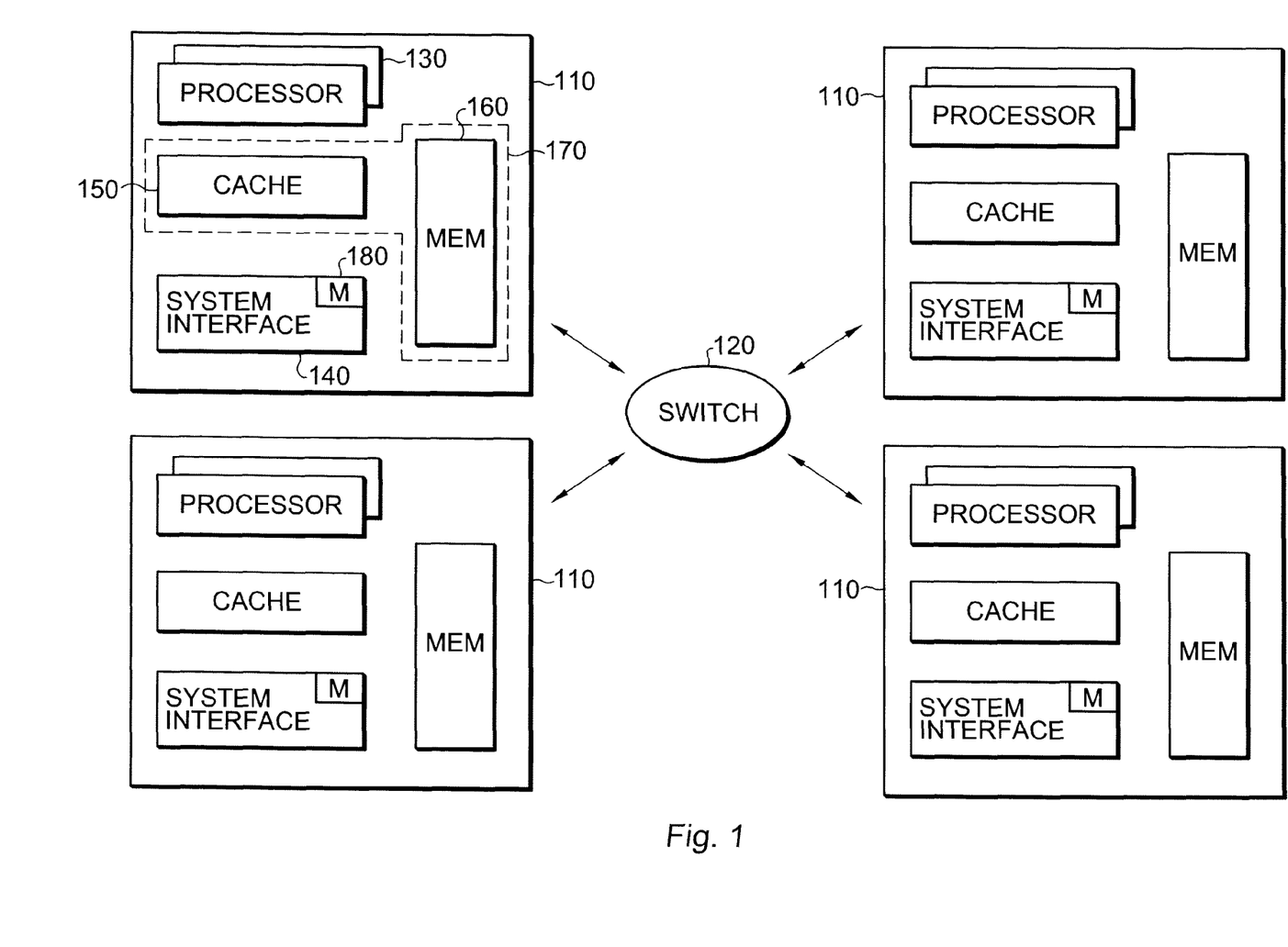
FIG. 1 shows a networked computer environment in which the present invention is implemented.

FIG. 1 depicts one embodiment of a network environment in which the present invention may be implemented. As previously described, one approach to parallel processing is utilization of a global shared memory. In a distributed memory system each local system may partition its total memory into a local portion and a shared portion. The collection of the shared portions become the global shared memory system which is distributed amongst the nodes. Distributed shared memory systems require cache coherence. When two or more computer processors work together on a single program each processor may have its own memory cache that is separate from the larger memory that the individual processors will access. Memory caching is effective because most programs access the same data or instructions over and over. By keeping as much of this information as possible in cache, the computer avoids accessing the slower memory sources.

When multiple processors or nodes with separate caches share a common memory, it is necessary to keep the caches in a state of coherence by ensuring that any shared operand that is changed in any cache is changed throughout the entire system. As discussed, this is typically done in either of two ways: through a directory-based or a snooping system. In a directory-based system, the data being shared is tracked in a common directory that maintains the coherence between caches. The directory acts as a filter through which the processor must ask permission to load an entry from the primary memory to its cache. When an entry is changed the directory either updates or invalidates the other caches with that entry. Recall that a directory is a table holding information about the memory of a node.

Turning now to FIG. 1, four nodes 110 are communicatively coupled via a switch 120. Each node includes, among other things, at least one processor 130, a system interface 140 and total memory component 170 comprised of cache 150 and main memory 160. Main memory 160 can be further divided into local and shared memory. The cache 150 is accessible only by the processors 130 local to that node 110. The shared memory, 160, sometimes referred to as the global or distributed memory, can be accessed by any processor within the system.

The architecture shown in FIG. 1 has hardware support for direct messages. And although the present invention is described in the context of a particular multiprocessor architecture, it is applicable to a wide variety of multiprocessor architectures. As depicted each node 110 can potentially have more than one processor 130 and hence have hardware support for local cache 150 coherence. Embodiments of the present invention are compatible with a wide variety of sets of cache states. Indeed the embodiments of the present invention discussed herein are easily altered to used different sets of cache states.

According to one embodiment of the present invention a directory based MESI protocol is utilized. In MESI protocol every cache line is marked with one of the four following states. M—Modified: The cache line is present only in the current cache, and is dirty; it has been modified from the value in main memory. The cache is required to provide the data on a subsequent miss request from another processor, or to write the data back to memory if the line is evicted. E—Exclusive: The cache line is present only in the current cache, but is clean meaning it matches main memory. S—Shared: This state indicates that this cache line may be stored in other caches of the machine. And finally, I—Invalid: This state indicates that this cache line is invalid.

Large scale multiprocessor systems often employ a distributed memory system. One embodiment of the present invention supports cache coherence that is transparent to the compiler of such a system or of an application running on such a system. According to one embodiment of the present invention the system interface 140 includes a conversion module 180 that monitors and intercepts memory system transactions such as cache miss requests from the processor(s), cache invalidation requests to and from other processors, and data sent to another processor, be it on the local node or on a remote node, to satisfy an earlier miss request. Once intercepted, the module 180 converts an otherwise hardware function into a direct message. Similarly, the module can receive direct messages from other nodes or processors and convert them into hardware transactions.

One skilled in the relevant art will recognize that memory transaction is a broad general categorization that includes cache coherency transactions, hyper-transport transactions and the like. While this description discusses the present invention primarily in terms of cache coherency it should be recognized that the invention is equally applicable to all forms of memory transactions and should not be limited by the examples provided herein.

To better understand the present invention however, consider the following simple example. A processor on a node issues a cache miss load request. This load request, an otherwise hardware transaction, is directed to a cache block stored on a remote node. The conversion module 180 within the system interface 140 identifies and intercepts the request and converts it to an direct message. This direct message is thereafter communicated via the switch 120 to another, remote node. The system interface 140 on this remote node receives the direct message and invokes a software handler for processing.

In large, this hybrid combination of both hardware transactions and direct messaging provides cache coherency on a performance scale only slightly worse than a 100% hardware solution at a fraction of the cost. It also requires no modification to an application or binary nor does it require any modification to the compiler. Prior software coherence systems have either used compiler directed coherence or software page-based distributed shared memory systems. As is well known in the art, compiler based coherence is problematic for system software and commercial applications, such as databases.

While software distributed shared memory techniques typically require large coherence granularity (page based) resulting in large bandwidth demands and a high degree of false sharing, embodiments of the present invention maintain coherence for each cache line reducing both bandwidth requirements and the instances of false sharing. Software schemes also require large overhead in processing and as the present invention utilizes both software and hardware transactions, the software processing overhead is inherently reduced. In fact the use of direct messaging hardware keeps processing overhead to a negligible amount.

Finally, some distributed memory schemes of the prior art require modification to the applications or binaries that limits their portability. The present invention is transparent to an application hence it has wide applicability to complex applications such as operating system kernels, commercial workloads and high performance computing applications.

Figure 2:
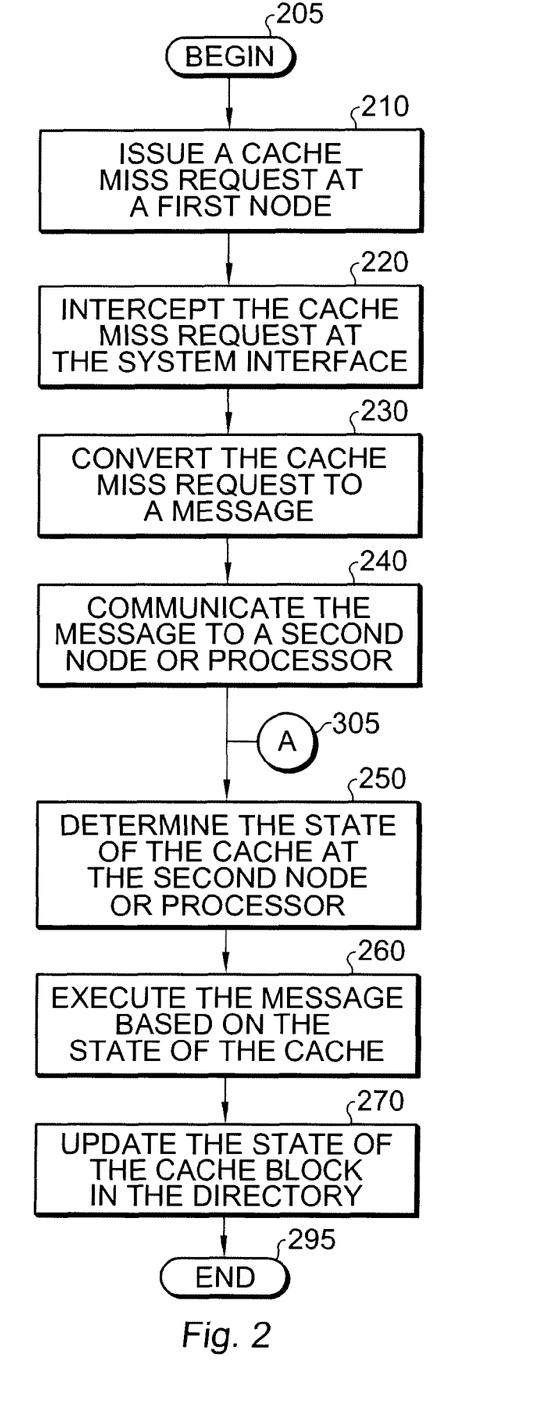
FIG. 2 shows a flow diagram for one method embodiment for implementing hybrid direct messaging cache coherence.

Turning now in addition to FIG. 2, a high level flow chart of one method embodiment for hybrid direct messaging cache coherence is shown. As a convention, assume that the node that has the miss is the requestor 'R', the home node or location of the requested block of data is 'H' and other nodes involved in coherence activity as target nodes 'T'. A directory is kept in memory and is pinned to the home-node of a referenced line of data.

FIGS. 2-5 are flowcharts illustrating methods of implementing an exemplary process for converting cache miss instructions into direct messages and vice-versa. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which are processed on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which are processed on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

The process begins 205 with the issuance of a cache miss request 210 at the first node from one of the processors. At the first node, the request is intercepted 220 by the system interface. The conversion module within the system interface converts 230 the request into a direct message that is then communicated 240 to a second node or second processor within the same node. The state of the cache is then determined 250. This inquiry may be at the second or home node or on the first or requesting node based on whether the request is local, inter-node, or directed at a remote node in the system. Once received, the direct message invokes a software handler 260 which examines the state of the cache, which is maintained in a software data structure.

Figure 3:
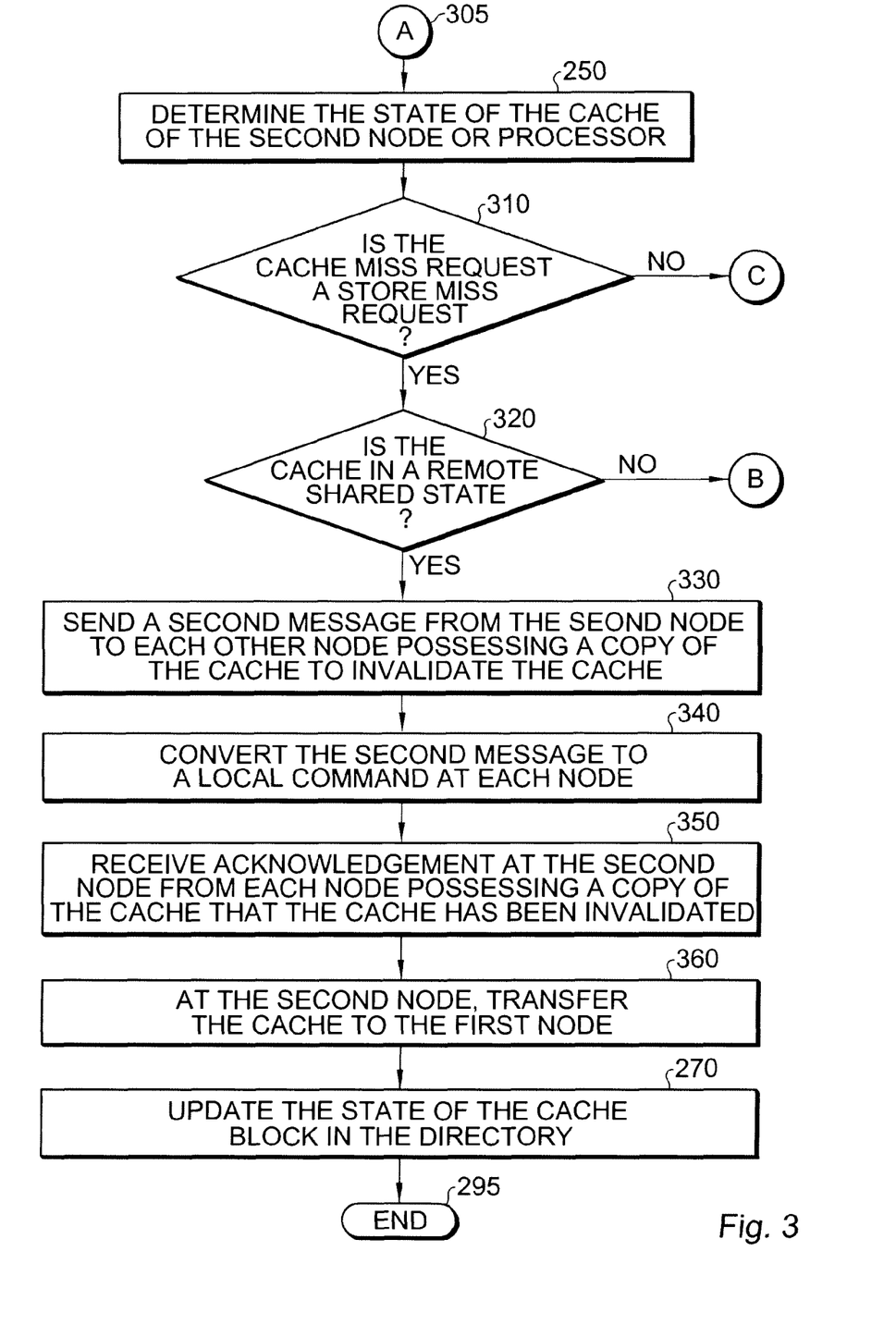
FIG. 3 shows a flow diagram for a store miss request in which the cache block is in a shared state, according to one embodiment of the present invention.

Once the message invokes a software handler, the state of the cache is updated 270 in the directory ending 295 the process. Similarly the software handler updates the directory state. The processing of the request is further expanded in FIG. 3. FIG. 3 shows a flow diagram for a store miss request in which the cache block is in a shared state, according to one embodiment of the present invention. The flow diagram enters at connect A 305, also shown on FIG. 2, to determine the access type. As before, the state of the cache of the second node or processor is determined 250 by accessing the directory so as to identify the steps that follow. After the state of the cache is obtained, an inquiry is made whether 310 the cache miss request is a store miss request. When the answer to this question is in the affirmative a second inquiry is made as to whether the cache is in a remote shared state 320. A remote shared state indicates that the cache block that is the target of the store miss request is shared among other processors though residing on the second node. The cache block may be present in other node's caches for use by those local processors. While the data resides on the second node in the shared portion of the memory, a modification to that block would render the other cached copies, invalid or non-coherent.

Responsive to the inquiry as to the shared state being yes and according to one embodiment of the present invention, the direct message sent from the first (requester) node to the second (home) node is sent to every other node in the system possessing a copy of the cache. In another embodiment of the present invention, the conversion module of the system interface of the second (home) node generates another, second direct message and communicates it 330 to each other node in the system possessing the cache directing the invalidation of the cache block originating from the second node.

Once received by the other remote nodes, the message is converted 340 to a local command and processed, thus invalidating any copies of the data block that may be present on other remote nodes. An acknowledgment of that invalidation is transmitted back 350 to the second node that each other cached copy of the data block has been invalidated. With that acknowledgment in place, the second node is free to transfer the cache block 360 to the requesting, first node. Once received, the first node sends an acknowledgment to the home node so that the cache can be unlocked. Finally the directory is updated 270 to reflect both the invalidation and the transfer.

As will be appreciated by one skilled in the art many of the steps outlined in the aforementioned paragraphs can be conducted by a combination of software and/or hardware. For example and according to one embodiment of the present invention, the transmittal of the invalidation direct messages and the cache block via direct messages as well as the reception of the invalidation acknowledgment direct messages and final acknowledgement direct message can be accomplished via software. Hardware can be configured to convert the invalidation direct message to local commands and convert the cache block data direct message to a data return local command. It can also be configured to send the invalidation and final acknowledgment in the form of a direct message. Similar delineations of software and hardware functions can be implemented and are within the context of the present invention as defined and described in this specification.

Figure 4:
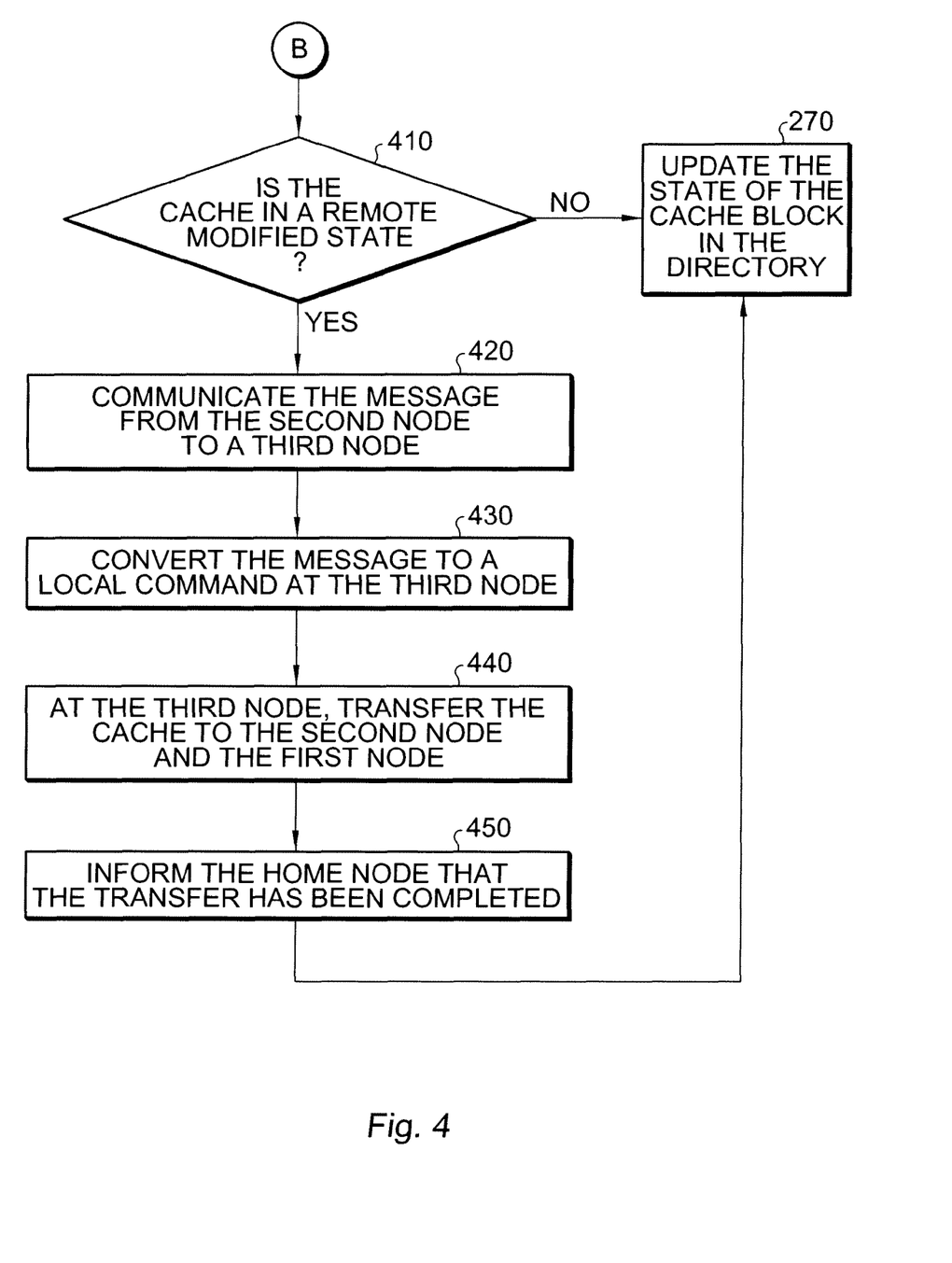
FIG. 4 shows a flow diagram for a store miss request in which the cache block is in a modified state, according to one embodiment of the present invention.

FIG. 4 shows a flow diagram for a store miss request in which the cache block is in a remote modified state, according to one embodiment of the present invention. As previously described, once it is determined that the cache miss request is a store miss request 310 the next question is whether the targeted cache block is in a remote shared state 320. When the response to that question is no, the inquiry turns to determining whether 410 the cache block is in a remote modified state. In this case the cache block has been modified at a remote location. Again a message from the second node is sent to the remote node 420. The message is converted 430 to a local hardware transaction (command) however rather than invalidating the cache the command directs the cache block to be transferred 440. The transfer is made directly from the remote node where the cache block was modified to the first (requesting) node. The first node then sends a final acknowledgement 450 to the home node that the transfer has occurred. The affected line of cache is unlocked and the directory is once again updated 270.

When the inquiry whether the cache is neither in a remote modified nor shared state the remaining state is that the cache block requested by the first node from the second node has neither been modified nor shared. The solution is simple and straightforward. Convert the message to a hardware transaction to retrieve the cache block and transfer the cache block to the requesting node. Of course, once the transfer is acknowledged the directory is thereafter updated 270.

Figure 5:
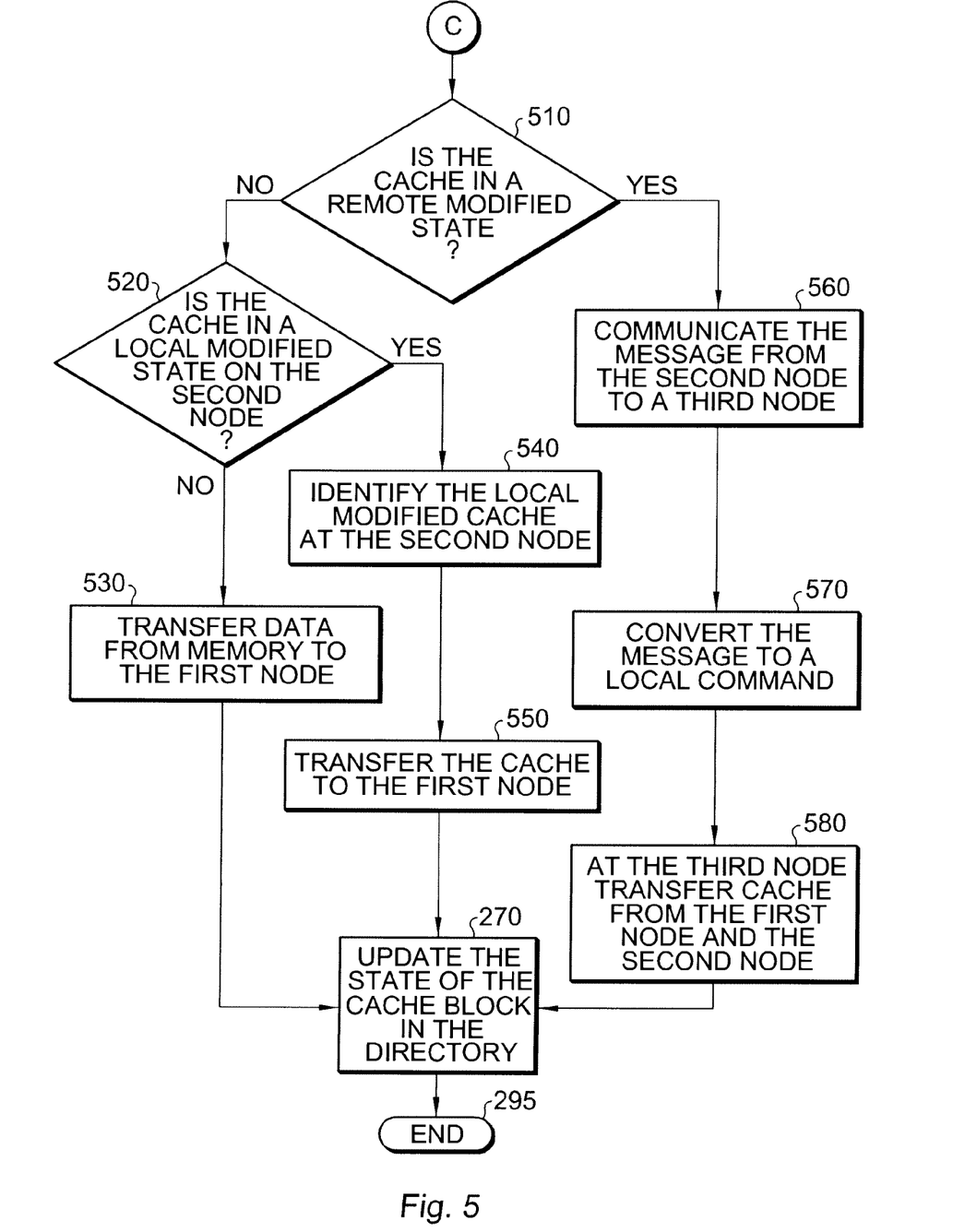
FIG. 5 shows a flow diagram for a load miss request according to one embodiment of the present invention.

FIG. 5 shows, according to one embodiment of the present invention, a flow diagram for a load miss request. The flow chart of FIG. 5 begins with the determination from FIG. 3 that the cache miss request is not a store miss request 310. In the embodiment depicted in FIG. 3 the result of that negative answer is that the request is therefore a load miss request. Other instructions such as updates and write-backs are also possible and certainly contemplated by the present invention. Thus it is understood that the matrix and flow chart presented herein are simply examples of particular instructions and are not intended to be exclusory in any manner.

Assuming for the example that the miss cache instruction is a load miss instruction, the method thereafter determines whether the cache block is either in a remote modified state 510, a local modified state 520 or simply in memory. When the determination finds that the cache is in local memory in an unmodified state, the load miss request is easily fulfilled. The memory handler directs the system interface to simply transfer the cache block 530 and once the transfer is complete, update the directory 270. When it is determined that the cache is local to the second node yet is modified 520 the modified block is identified 540 and thereafter transferred 550 to the requester. The transfer is acknowledged and again the directory is updated 270.

Finally when the load miss request finds that the cache is in a remote modified state 510, the system interface communicates a message 560 from the second node to the remote node directing the remote node to forward and downgrade the cache. At the remote node the message is converted 570 to a local command by the conversion module which is thereafter processed. As a result, the cache is identified and transferred 580 to the requesting node and a copy is sent to the second, home node. As before, the directory is updated 270 to keep a running record of the state of the cache in the system.

For an upgrade instruction the steps are substantially the same as for a cache miss. However during an upgrade the block of memory will not be in a modified state at any node. Also no data is transferred in an update so the process is much simpler.

Similarly, for a write-back operation, data is written back to the system interface on the requesting node as a normal write-back transaction (in hardware according to one embodiment). The write-back transaction is converted to a write-back direct message by the conversion module of the system interface at the requesting node and sent to the system interface of the home node. This direct message is received by a software handler at the home node, which stores the data back to memory and updates the directory. Although the present invention has been described and illustrated with a certain degree of particularity (load miss and store miss request for instance), it is understood that the present disclosure has been made only by way of example, and that numerous changes in the combination and arrangement of parts can be resorted to by those skilled in the art without departing from the spirit and scope of the invention.

The present invention processes memory access instructions to global shared memory in a multiprocessor parallel processing system as direct messages. A conversion module resident on the system interface converts memory access instructions to these direct messages and vice-versa converts direct messages back to memory access instructions received from other nodes. This hybrid approach to cache coherency provides a scalable and efficient means to maintain cache coherence in multiprocessor systems.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A cache coherency system in a message passing multiprocessor architecture, the system comprising:
    a plurality of nodes interconnected by a switch wherein each node includes at least one processor, a cache, a main memory and a system interface, wherein a portion of the main memory of each of the plurality of nodes forms a distributed shared memory;
    a messaging module associated with each of the system interfaces, the messaging module configured to convert memory transactions regarding the distributed shared memory into messages and to convert messages regarding the distributed shared memory into memory transactions, wherein the memory transactions are hardware transactions, and wherein the messages are direct executable messages for transmission between the nodes via the switch; and
    a software handler associated with each of the nodes, wherein the software handler implements a coherency protocol for executing the messages.

2. The cache coherency system of claim 1 wherein messages converted to memory transactions are received from either one of the at least one processors on that node or another node.

3. The cache coherency system of claim 1 wherein memory transactions converted to messages are directed to either one of the at least one processors on that node or another node.

4. The cache coherency system of claim 1 wherein messages include load memory requests.

5. The cache coherency system of claim 1 wherein messages include store memory requests.

6. The cache coherency system of claim 1 wherein memory transactions include cache coherence transactions.

7. The cache coherency system of claim 1 wherein memory transactions include hypertransport transactions.

8. The cache coherency system of claim 1 wherein main memory includes local memory portion accessible only by the at least one processor at each node, and a global memory portion accessible by each node in the multiprocessor architecture.

9. The cache coherency system of claim 8 wherein a summation of each global memory portion from each node forms the distributed shared memory.

10. The cache coherency system of claim 1 wherein the main memory includes a directory, and wherein the directory is based on the coherency protocol and identifies distinct states of the cache.

11. A method for managing cache coherency in a message passing multiprocessor architecture, wherein said architecture includes a plurality of nodes interconnected by a switch, and wherein each node includes at least one processor, a cache, a main memory, a system interface, and a software handler, the method comprising:
    issuing a cache miss request by one of the at least one processor at a first node of the plurality of nodes to a second node;
    intercepting the cache miss request by the system interface at the first node;

at the first node, converting the cache miss request to a message, wherein said message is a direct executable message;

communicating the message to the second node;

at the second node, receiving the message;

at the second node, determining a state of a cache block;

at the second node, executing the message by the software handler; and at the second node, updating the state of the cache block.

12. The method of claim 11 wherein the cache miss request is a load miss request.

13. The method of claim 12 wherein responsive to the cache block being in the main memory of the second node, further comprising transferring the cache block to the first node.

14. The method of claim 12 wherein responsive to the cache block being modified and residing in the cache of the second node, further comprising transferring the cache block from the cache of the second node to the first node.

15. The method of claim 12 wherein responsive to the state of the cache block being modified and residing in a third node, further comprising sending a second message to the third node to forward and downgrade the cache block.

16. The method of claim 11 wherein the cache miss request is a store miss request.

17. The method of claim 16 wherein responsive to the cache block being in a shared state, further comprising the steps:

communicating a second message to each other node possessing copies of the cache block in the plurality of nodes invalidating the cache block;

communicating a second message to the third node invalidating the cache block;

converting the second message at the third node to a local command invalidating the cache block;

at the second node, receiving an acknowledgement from each other node possessing copies of the cache block confirming local cache block invalidation; and at the second node, transferring the cache block to the first node.

18. The method of claim 16 wherein responsive to the cache block being in a modified state on a third node, further comprising the steps:

communicating the message to the third node;

converting the message at the third node to a local command;

at the third node, transferring the cache block to the first node and the second node; and acknowledging transferring the cache block.

19. The method of claim 11 wherein the cache miss request is an upgrade request.

20. The method of claim 11 wherein the cache miss request is a write-back request.

* * * * *